INVENTOR
Harry Donald Kitchin
BY
Baldwin & Wight
ATTORNEYS

Sept. 27, 1966 H. D. KITCHIN 3,275,847

TRANSISTORIZED SAW-TOOTH WAVE GENERATORS UTILIZING DIRECT CURRENT NEGATIVE FEEDBACK

Filed Sept. 12, 1963

2 Sheets-Sheet 2

INVENTOR

Harry Donald Kitchin

BY

Baldwin & Wight

ATTORNEYS

United States Patent Office 3,275,847
Patented Sept. 27, 1966

3,275,847

TRANSISTORIZED SAW-TOOTH WAVE GENERATORS UTILIZING DIRECT CURRENT NEGATIVE FEEDBACK

Harry Donald Kitchin, Chalfont St. Peter, Buckinghamshire, England, assignor to The Marconi Company Limited, London, England, a British company Filed Sept. 12, 1963, Ser. No. 308,468
Claims priority, application Great Britain, Oct. 1, 1962, 37,027/62
9 Claims. (Cl. 307—88.5)

Figure 1:
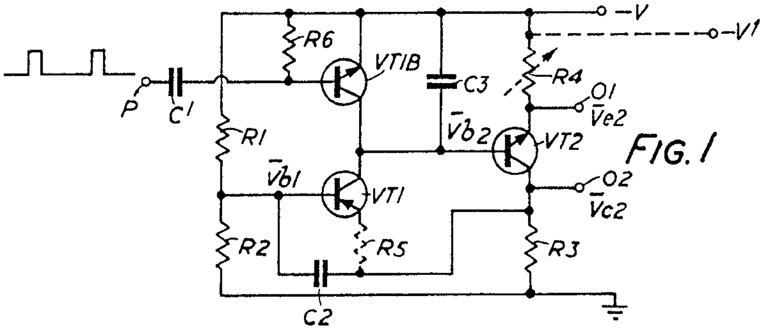

This invention, which is for improvements in or modifications of the invention forming the subject of the British patent application No. 33,835/62, relates to saw-tooth wave generators and has for its object to provide improved simple transistor saw-tooth wave generators of good consistency of amplitude, high linearity, and high stability of transistor operating point despite leakage current changes. As will be clear later, a further advantage of the invention is that it can be readily employed to provide saw-tooth wave generators giving push-pull output waveforms.

According to the parent invention, a direct coupled transistor amplifier is provided wherein a negative direct current feedback circuit is provided from a later transistor to cause a transistor to which said feedback is applied to operate as a stabilizer for reducing variations of the operating point of said later transistor due to changes in transistor leakage currents, such as would be produced by changes in ambient temperature. This invention comprises an additional transistor connected and arranged to serve as an input transistor supplying alternating current input signals to the amplifier whereby the transistor to which said feedback is applied is enabled to act as a stabilizer without producing undesired attenuation of said input signals.

The present invention seeks to modify circuits in accordance with the parent specification to change them from direct current amplifiers to saw-tooth wave generators.

According to this invention, a saw-tooth wave generator comprises an output transistor; a negative direct current feedback circuit extending from said output transistor to a preceding transistor which is directly or indirectly in cascade therewith to cause said preceding transistor to operate as a stabilizer to reduce variations of the operating point of the output transistor due to changes in transistor leakage currents; means for by-passing alternating current voltages around said preceding transistor; an additional transistor; means for applying a fixed pre-determined potential to the base of said preceding transistor; a condenser which is connected to be charged at approximately constant current by current from said preceding transistor and is also included in a circuit in shunt with said additional transistor; and means for periodically pulsing said additional transistor to cause it to discharge said condenser.

A generator in accordance with this invention may be either of the pulse driven type or of the free-running type. In the former case suitable driving pulses are applied from an external source to the base of the additional transistor. In the latter case various arrangements for causing pulsing of the additional transistor at the required frequency are possible: for example it may be pulsed by means of an auxiliary positive feedback circuit with which frequency determining timing elements to determine the frequency are associated.

One embodiment of the invention comprises a first transistor the base of which is connected to a point of pre-determined fixed potential and which is in parallel with an additional transistor, another transistor directly or indirectly in cascade with said first transistor, a by-pass capacitance by-passing alternating current voltage around the first transistor, a negative direct current feedback circuit extending from said other transistor to said first transistor, a condenser included in a shunt circuit across the additional transistor and means for pulsing said additional transistor at a pre-determined frequency to cause it to discharge said condenser at said frequency. Said pulsing means may comprise an external source of pulses of the required frequency connected to the base of the additional transistor. This will result in a saw-tooth wave generator driven by said external source. Alternatively the generator may be made free running by providing an auxiliary positive feed back path with associated frequency-determining tuning elements, said path extending back to the base of the additional transistor.

If desired, at least one further transistor may be provided in a cascade succession of transistors including said first transistor and said other transistor.

Saw-tooth output waves may be taken from the collector side of said other transistor and/or from the emitter side thereof. Output waves from these two places will be in phase opposition.

Figure 2:
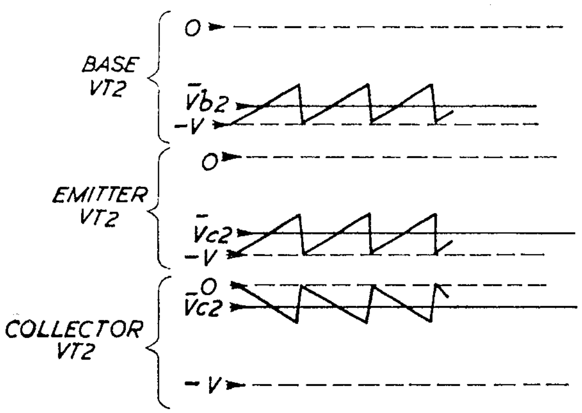
Figure 3:
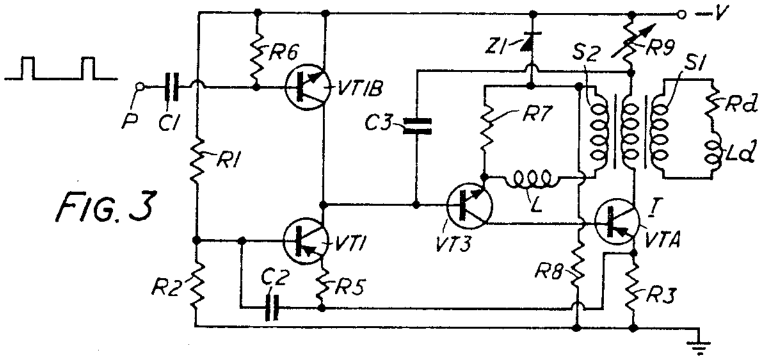
Figure 4:
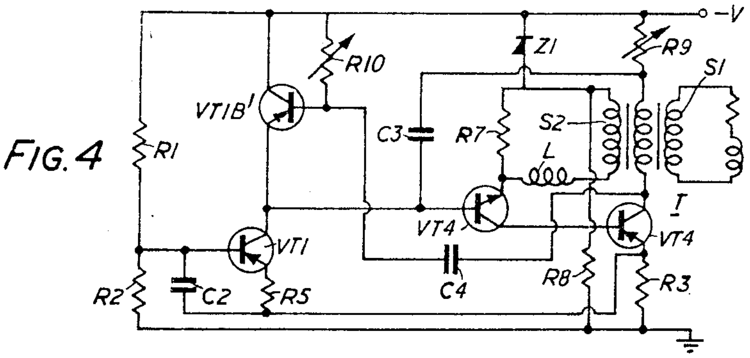

The invention is illustrated in and further explained in connection with the accompanying drawings in which FIG. 1 shows diagrammatically one embodiment of this invention. FIG. 2 is an explanatory graphical figure relating to the operation of FIG. 2; and FIGS. 3 and 4 show further embodiments of this invention.

Referring to FIG. 1, which shows one form of externally driven saw-tooth wave generator in accordance with this invention, the base of a transistor VT1 is connected to the junction point between two resistances R1 and R2 in series between a point of applied operating potential —V and ground. The collector of this transistor is connected to the base of another transistor VT2 and to the collector of an additional transistor VT1B, the emitter of which is connected to the operating potential supply terminal —V, and the base of which is connected to said terminal through a resistance R6 and also through a condenser C1 to a pulse input terminal P to which periodic positive going pulses are applied from an external driving pulse source (not shown). The emitter of the transistor VT2 is connected through a resistance R4 to the terminal —V, and the collector of this transistor is connected to ground through a resistance R3 and also to the emitter of transistor VT1 preferably through a resistance R5 which is shown in dotted lines to indicate that it is optional.

A by-pass condenser C2 is connected between the collector of transistor VT2 and the base of transistor VT1. A storage condenser C3 is connected between the emitter and the collector of the transistor VT1B. Saw-tooth wave outputs, which will be in phase opposition, may be taken at terminal 01 from the emitter of transistor VT2 or at terminal 02 from the collector thereof, or both.

As in the case of a direct coupled transistor amplifier in accordance with the parent invention, the transistor VT1 stabilizes the operating point of the transistor VT2 to reduce variations of the operating point thereof due to changes in transistor leakage currents and in the values of the resistances R1 and R2 which determine the base potential of VT1. Transistor VT1 can be selected solely with stability requirements in mind, since this transistor does not have to handle A.C. components, the condenser C2 serving to eliminate all A.C. fluctuations from VT1. For A.C. components, therefore, the collector of VT1 presents a high impedance and behaves as a constant current generator.

The negative D.C. feedback path from VT2 to VT1 stabilizes the mean emitter potential close to the mean D.C. potential $\overline{V_{b1}}$ of the base of VT1. The mean D.C. emitter potential $\overline{V_{e2}}$ of VT2 will accordingly be stabilized at a value dependent on the relative values of the resistances R3 and R4 and the potential $\overline{V_{b1}}$.

The pulses applied to the base of VT1B cause this transistor periodically to discharge the condenser C3 and, from the A.C. point of view, each discharge causes the instantaneous potential at the base of VT2 to increase in the negative direction to potential —V. After each pulse, the substantially constant current provided by VT1 causes the negative potential across C3 to decrease approximately linearly, thus producing the flank of the saw-tooth. Because of the "self-setting" action with regard to mean D.C. potentials, the mean D.C. potential $\overline{V_{b2}}$ on the base of VT2 will be independent of A.C. fluctuations.

It will be seen, therefore, that the peak value of the saw-tooth is obtained when C3 is completely discharged. The peak value will be $V-\overline{V_{b2}}$ and, assuming complete linearity of the saw-tooth, the peak-to-peak value will be $2(V-\overline{V_{b2}})$. It should be noted that this peak-to-peak value is independent of all other circuit parameters. Accordingly if variation of saw-tooth amplitude is required, this may be achieved by making R4 variable, as indicated by the broken line arrow, or by returning it to a terminal $-V^1$ of adjustable potential as indicated by a broken line connection.

The degree of linearity of the saw-tooth is governed by the degree of approximation to constant current in VT1 over the saw-tooth and by the effective loading of condenser C3 by the base circuit of VT2. The provision of the resistance R5 (shown dotted) as a feed-back resistance in the emitter circuit of VT1 improves the consistency of current of this transistor. The loading in the condenser C3 can be reduced by increasing its capacitance and by keeping the base current of VT2 as small as possible, e.g. by using a high gain transistor for VT2.

FIG. 2 shows the waveform at the base, emitter, and collector of VT2, the voltage —V being the applied voltage at the terminal so marked, and $\overline{V_{b2}}$, $\overline{V_{e2}}$, and $\overline{V_{c2}}$ being the mean D.C. potentials on these electrodes, respectively. $\overline{V_{e2}}$ is approximately equal to $\overline{V_{b2}}$, and $\overline{V_{c2}}$ is approximately equal to $\overline{V_{b1}}$, which is the mean D.C. potential on the base of VT1.

The invention is not limited to the embodiment of FIG. 1 which shows what is probably the simplest form of saw-tooth wave generator in accordance with the invention. FIG. 3 shows a rather more complex embodiment, with more stages than in FIG. 1 and incorporating local feedback for improved linearization. The embodiment of FIG. 3 is particularly suitable for the generation of saw tooth current waves for electro-magnetic deflection in a television cathode ray tube. For such use in television equipment operating in accordance with present day British television standards, the saw tooth wave frequency will be 50 c.p.s.

Referring to FIG. 3, this includes two transistors VT3, VT4 in place of the single transistor VT2 of FIG. 1. The transistors VT3, VT4 form a two-stage amplifier, and in the collector circuit of VT4 is the primary of a transformer T having a secondary S1 supplying saw-tooth waves to the electro-magnetic deflection means of a television cathode ray tube (not otherwise represented). In FIG. 3 the deflection means are represented by their equivalent resistance $R_d$ and inductance $L_d$ in series. The transformer T has another secondary S2 providing local A.C. feedback through a circuit including inductance L and resistance R7 to the emitter of VT3. The values of L and R7 are chosen to provide a time constant substantially equal to that of the deflection coils, i.e. substantially equal to that given by the equivalent elements $L_d$ and $R_d$. In this way the voltage developed across R7 is caused to be the same as that across $R_d$. The mean potential of the emitter of VT3 is established by means of a Zener diode Z1 and a "bleeder" resistance R8. Accordingly, the peak saw-tooth wave amplitude is caused to be very nearly equal to the voltage across the Zener diode Z1, and will be to a large extent independent of the supply potential as well as of other circuit parameters. In the collector circuit of VT4 is a resistance R9, which may be adjustable, and which serves to add a linearizing voltage component to the saw tooth wave developed across condenser C3 and thus to provide compensation for loading of this condenser by VT3.

The arrangement of FIG. 3 is capable of producing saw-tooth waves of high linearity and with an excellent degree of freedom from drift and the like. It is highly stable.

The embodiments shown in FIGS. 1 and 3 are driven by external sources (not shown) connected at P. Clearly, however, they require little modification to make them free-running oscillators and auxiliary positive feedback paths with associated frequency determining timing elements could be provided, in any convenient way known per se, to achieve this result. Thus, for example, in either FIG. 1 or FIG. 3, the transistor VT1B could be connected in a blocking oscillator circuit as known per se. Again the embodiment of FIG. 1 could be made self-oscillating by connecting the terminal P to the collector of VT2. Similarly, the embodiment of FIG. 3 could be made self-oscillating by connecting the terminal P to the emitter of VT4.

A preferred free-running saw-tooth time base is shown in FIG. 4 which is a modification of FIG. 3 and generally similar thereto. In FIG. 4 the transistor which discharges the condenser C1 and is here referred $VT1B^1$ is of the PNP type and receives positive feedback from the collector of VT4. The frequency of oscillation is determined by the values of the capacitance C4 and the resistance R10 associated with the positive feedback circuit and may be adjusted by adjusting either or both of these elements. In the circuit shown R10 is adjustable—probably the most convenient arrangement.

Various modifications apparent to those skilled in the art may be made to the circuits shown. Thus, in FIGS. 3 and 4 the single stage comprising transistor VT3 could be replaced by a two-stage or multi-stage direct coupled transistor amplifier. In all cases, by making circuit changes which need no description here, transistors shown as of the PNP type could be replaced by transistors of the NPN type and vice versa.

I claim:

1. A sawtooth generator comprising a first capacitor, first transistor means coupled to said first capacitor to apply a substantially constant charging current thereto and thus to produce a linearly rising voltage thereacross, means coupled to said first capacitor to periodically discharge said first capacitor and thus to produce a time sequence of linearly rising and falling voltages thereacross, second transistor means coupled to said first capacitor to amplify said rising and falling voltages developed thereacross, and a direct current negative feedback loop connected between the output of said second transistor means and said first transistor means to stabilize the operation of said second transistor means.

2. The combination defined in claim 1 and also including a second capacitor connected in shunt with said first transistor means to render said first transistor means insensitive to alternating current voltage variations.

3. The combination defined in claim 2 wherein said first transistor means includes a first transistor having base, emitter, and collector electrodes, a reference voltage source coupled to the base of said first transistor, the emitter-collector circuit of said first transistor being coupled to said first capacitor to apply said charging current thereto, said negative feedback loop being connected to emitter-collector circuit of said first transistor, and said second capacitor being coupled between the base and emitter-collector circuit of said first transistor.

4. The combination defined in claim 3 wherein said means for periodically discharging said first capacitor comprises third transistor means including a third transistor having base, emitter, and collector electrodes, a voltage source coupled to the base of said third transistor to normally cut off the emitter-collector circuit thereof, the emitter-collector circuit of said third transistor being connected in parallel with said first capacitor, and means for periodically applying pulses to the base of said third transistor to render the emitter-collector thereof conductive and thus to periodically discharge said first capacitor.

5. The combination defined in claim 4 wherein said second transistor means comprises a second transistor having base, emitter, and collector electrodes, the base of said second transistor being connected to said first capacitor, the emitter-collector circuit thereof comprising the output circuit of said sawtooth waveform generator, and said direct negative feedback loop being connected between the emitter-collector circuits of said first and second transistors.

6. The combination defined in claim 5 wherein said first and second transistors are complementary in type, one being a PNP transistor and the other an NPN transistor, and wherein said direct negative feedback loop is connected between the emitter of one of said two transistors and the collector of the other.

7. The combination defined in claim 6 and also including a series resistor in said direct negative feedback loop.

8. The combination defined in claim 3 wherein said means for periodically discharging said first capacitor comprises third transistor means including a third transistor having base, emitter, and collector electrodes, the emitter-collector circuit of said third transistor being coupled in parallel with said first capacitor, the base of said third transistor being coupled to said second transistor means in such manner as to normally cut off the emitter-collector circuit of said third transistor and to periodically render it conductive when the voltage across said first capacitor reaches a predetermined level, thereby periodically discharging said first capacitor.

9. The combination defined in claim 8 and also including a resistor and capacitor connected in series between the base of said third transistor and said second transistor means to determine the frequency at which said third transistor is rendered conductive.

References Cited by the Examiner

UNITED STATES PATENTS

| | | | |
|---|---|---|---|
| 2,237,425 | 4/1941 | Geiger et al. | 328—184 |
| 2,554,172 | 5/1951 | Custin | 328—184 |
| 2,597,322 | 5/1952 | Higinbotham | 328—184 |
| 2,662,981 | 12/1953 | Segerstrom | 328—67 |
| 3,001,086 | 9/1961 | Martinez | 328—184 |

OTHER REFERENCES

"Junction-Transistor Bootstrap Linear-Sweep Circuits" by Nambiar and Boothroyd, Proceedings of the Institute of Electrical Engineers, January 1957, vol. 10, Part B, No. 15, pp. 293–305.

ARTHUR GAUSS, *Primary Examiner.*

R. H. EPSTEIN, *Assistant Examiner.*